United States Patent
Shank et al.

(10) Patent No.: US 11,332,101 B2
(45) Date of Patent: *May 17, 2022

(54) VEHICLE WINDSHIELD CLEANING SYSTEM

(71) Applicant: UUSI, LLC, Reed City, MI (US)

(72) Inventors: David Shank, Hersey, MI (US); Justin Lawrence Paquette, Manton, MI (US); Demetris Andreou Agrotis, Saint James, NY (US); Edward J. Cox, II, Marion, MI (US)

(73) Assignee: UUSI, LLC, Reed City, MI (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/721,035

(22) Filed: Sep. 29, 2017

(65) Prior Publication Data
US 2018/0086317 A1 Mar. 29, 2018

Related U.S. Application Data

(63) Continuation-in-part of application No. 14/923,286, filed on Oct. 26, 2015, now Pat. No. 10,384,653.
(Continued)

(51) Int. Cl.
*B60S 1/48* (2006.01)
*B08B 5/02* (2006.01)
(Continued)

(52) U.S. Cl.
CPC .............. *B60S 1/487* (2013.01); *B05B 9/002* (2013.01); *B08B 3/02* (2013.01); *B08B 3/10* (2013.01);
(Continued)

(58) Field of Classification Search
CPC .......... B60S 1/482; B60S 1/487; B60S 1/488; B60S 1/50; B60S 1/54; B60S 1/56;
(Continued)

(56) References Cited

U.S. PATENT DOCUMENTS

| 4,090,668 A | 5/1978 | Kochenour |
| 4,233,494 A | 11/1980 | Pawlik et al. |

(Continued)

FOREIGN PATENT DOCUMENTS

| CN | 1268089 A | 9/2000 |
| CN | 2776963 Y | 5/2006 |

(Continued)

OTHER PUBLICATIONS

European Office Action (EP Appln. No. 08 826 506.1); dated: Oct. 29, 2018.
(Continued)

*Primary Examiner* — Darren W Gorman
(74) *Attorney, Agent, or Firm* — Howard & Howard Attorneys PLLC (57) ABSTRACT

Apparatus for providing heated cleaning fluid to a vehicle surface includes an inlet port for receiving an amount of fluid, a housing bounding a reservoir in fluid communication with the inlet port, and an outlet port in fluid communication with the reservoir for dispensing an amount of heated fluid. A heater element heats fluid passing from the inlet port to the outlet port through the reservoir. A heat exchanger in thermal contact with the heater element for conveying heat to fluid within the reservoir has a strut that divides fluid entering the housing through the inlet port into two flow paths and elongated fins extending outwardly from the strut at transverse angles that bound fluid flow channels for fluid moving through the reservoir. A control circuit energizes the heater element to heat the heating element and the fluid passing from the inlet port to the outlet port through the reservoir.

31 Claims, 7 Drawing Sheets

Related U.S. Application Data which is a continuation-in-part of application No. 13/948,450, filed on Jul. 23, 2013, now Pat. No. 9,188,268, which is a continuation-in-part of application No. 11/928,738, filed on Oct. 30, 2007, now Pat. No. 7,857,238, and a continuation-in-part of application No. 11/341,116, filed on Jan. 27, 2006, now Pat. No. 7,588,194, which is a continuation-in-part of application No. 10/894,266, filed on Jul. 19, 2004, now Pat. No. 7,641,131.

(60) Provisional application No. 62/401,713, filed on Sep. 29, 2016, provisional application No. 60/952,036, filed on Jul. 26, 2007, provisional application No. 60/551,571, filed on Mar. 9, 2004.

(51) Int. Cl.

| | | |
|---|---|---|
| *B08B 3/02* | (2006.01) | |
| *B08B 3/10* | (2006.01) | |
| *B08B 6/00* | (2006.01) | |
| *F24H 9/20* | (2022.01) | |
| *B05B 9/00* | (2006.01) | |
| *B60S 1/50* | (2006.01) | |
| *F24H 1/12* | (2022.01) | |
| *B60S 1/60* | (2006.01) | |
| *B05B 9/04* | (2006.01) | |

(52) U.S. Cl.
CPC .......... *B08B 5/02* (2013.01); *B08B 6/00* (2013.01); *B60S 1/482* (2013.01); *B60S 1/488* (2013.01); *B60S 1/50* (2013.01); *B60S 1/603* (2013.01); *F24H 1/122* (2013.01); *F24H 9/2028* (2013.01); *B05B 9/0403* (2013.01); *B08B 2203/007* (2013.01); *Y10T 137/6579* (2015.04)

(58) Field of Classification Search
CPC ... B60S 1/603; B08B 3/02; B08B 3/10; B08B 5/02; B08B 6/00; B08B 2203/007; B05B 9/002; B05B 9/0403; F24H 1/122; F24H 9/2028; Y10T 137/6579
See application file for complete search history.

(56) References Cited

U.S. PATENT DOCUMENTS

| | | | |
|---|---|---|---|
| 4,508,957 A | 4/1985 | Rocchitelli | |
| 4,920,602 A * | 5/1990 | Kuehbauch | B60S 1/3415 |
| | | | 15/250.04 |
| 5,012,977 A | 5/1991 | Karlins et al. | |
| 5,046,449 A | 9/1991 | Nelson | |
| 5,354,965 A | 10/1994 | Lee | |
| 5,509,606 A | 4/1996 | Breithaupt et al. | |
| 5,927,608 A | 7/1999 | Scorsiroli | |
| 5,957,384 A | 9/1999 | Lansinger | |
| 6,029,908 A | 2/2000 | Petzoid | |
| 6,032,324 A | 3/2000 | Lansinger | |
| 6,133,546 A | 10/2000 | Bains | |
| 6,164,564 A | 12/2000 | Franco et al. | |
| 6,257,500 B1 | 7/2001 | Petzoid et al. | |
| 6,364,010 B1 | 4/2002 | Richman et al. | |
| 6,465,765 B2 | 10/2002 | Katayama et al. | |
| 6,601,776 B1 | 8/2003 | Oljaca et al. | |
| 6,615,438 B1 | 9/2003 | Franco et al. | |
| 6,669,109 B2 | 12/2003 | Ivanov et al. | |
| 6,789,744 B2 | 9/2004 | Bissonnette et al. | |
| 6,892,417 B2 | 5/2005 | Franco et al. | |
| 6,952,524 B2 | 10/2005 | Bissonnette et al. | |
| 7,108,754 B2 | 9/2006 | Franco et al. | |
| 7,127,158 B1 | 10/2006 | Yen et al. | |
| 7,128,136 B2 | 10/2006 | Gregory | |
| 9,188,268 B2 | 11/2015 | Shank et al. | |
| 2001/0054655 A1* | 12/2001 | Berg | B60S 1/481 |
| | | | 239/284.1 |
| 2002/0137455 A1 | 9/2002 | Ivanov et al. | |
| 2003/0042328 A1 | 3/2003 | Wojan et al. | |
| 2003/0141381 A1 | 7/2003 | Bissonnette et al. | |
| 2003/0141382 A1 | 7/2003 | Bissonnette et al. | |
| 2003/0201672 A1 | 10/2003 | Stranberg et al. | |
| 2003/0222156 A1 | 12/2003 | Bissonnette | |
| 2004/0101293 A1 | 5/2004 | Bissonnette et al. | |
| 2004/0170411 A1 | 9/2004 | Kuebler et al. | |
| 2004/0197094 A1 | 10/2004 | Amberg | |
| 2004/0226127 A1 | 11/2004 | Kaplan | |
| 2005/0083638 A1 | 4/2005 | Warren et al. | |
| 2005/0086758 A1 | 4/2005 | Arkashevski et al. | |
| 2006/0124761 A1 | 6/2006 | Shank et al. | |
| 2006/0196448 A1 | 9/2006 | Hayworth et al. | |
| 2007/0284457 A1 | 12/2007 | Shank et al. | |
| 2008/0203188 A1 | 8/2008 | Arkashevski et al. | |
| 2012/0037606 A1 | 2/2012 | Huang et al. | |
| 2012/0117745 A1 | 5/2012 | Hattori et al. | |
| 2012/0192959 A1* | 8/2012 | Wein | B60S 1/50 |
| | | | 137/98 |
| 2012/0266403 A1* | 10/2012 | Fitterer | B60S 1/08 |
| | | | 15/250.04 |
| 2015/0321621 A1* | 11/2015 | Van Dan Elzen | H05K 1/09 |
| | | | 348/148 |
| 2016/0046264 A1 | 2/2016 | Shank et al. | |
| 2016/0272164 A1 | 9/2016 | Hsiao et al. | |

FOREIGN PATENT DOCUMENTS

| | | |
|---|---|---|
| EP | 0 219 126 A2 | 4/1987 |
| EP | 1 213 197 A1 | 6/2002 |
| FR | 2763549 A1 | 11/1998 |
| GB | 2 253 339 A | 9/1992 |
| WO | 97/464314 A1 | 12/1997 |
| WO | 98/58826 A1 | 12/1998 |
| WO | 02/092237 A | 11/2002 |
| WO | 2005/076735 A2 | 8/2005 |

OTHER PUBLICATIONS

European Office Action (EP Appln. No. 17 194 243.6); dated: Oct. 10, 2018.
European Office Action (EP Appln. No. 08 826 506.1); dated: Jun. 8, 2018.
Extended European Search Report (EP Patent Application No. 17 194 243.6); dated: Feb. 12, 2018.
Jacobs Electronics Safe-Vue Heather Brochure, pp. 1-4, at least as early as Jun. 28, 2002.
1 page Valeo OPTI-Wash spec sheet, date unknown.
3 page website, www.aaro.ca/BreakingNews/Sep26-Oct17-01NwsBfs. html, posted Oct. 1, 2001.
4 page installation and owner's manual, Safe-Vue Heater, kit # 250-6652, Rostra Precision Controls, Inc. (1999).
Tech briefs, 1 page, Mar. 2003.
4 page website, www.buyhotshot.com/faq.asp?ins=8, (Jan. 2003).
Bennett, "Hot water clears icy windshields", 2 pages, Free Press, date unknown.
2 page website, www.theautochannel.com/news/2001/09/20-29185/ html, "Valeo Maximizes Driver Visibility with OPTI-Wash Heated Wash System" (Jun. 2003).
1 page website, www.ai-online.com/issues/article_detail.asp?id=22, (Jun. 2003).
European Office Action (EP Appln. No. 19157217.1); dated: May 27, 2019.
Final Office Action (U.S. Appl. No. 14/923,286); Notification Date: Sep. 7, 2018.

* cited by examiner

VEHICLE WINDSHIELD CLEANING SYSTEM

CROSS-REFERENCE TO RELATED APPLICATION(S)

The present application claims priority from provisional application Ser. No. 62/401,713, filed Sep. 29, 2016, and is a continuation-in-part of application Ser. No. 14/923,286, now U.S. Pat. No. 10,384,653, filed Oct. 26, 2015, which is a continuation-in-part of application Ser. No. 13/948,450, now U.S. Pat. No. 9,188,268 filed Jul. 23, 2013, which is continuation-in-part of application Ser. No. 11/928,738, now U.S. Pat. No. 7,857,238 filed Oct. 30, 2007, which claims priority from provisional application Ser. No. 60/952,036, filed Jul. 26, 2007, and is a continuation-in-part of application Ser. No. 11/341,116, now U.S. Pat. No. 7,588,194 filed Jan. 27, 2006, which is a continuation-in-part of application Ser. No. 10/894,266, now U.S. Pat. No. 7,641,131 filed Jul. 19, 2004 (claiming priority from provisional application 60/551,571, filed Mar. 9, 2004), all of which are incorporated herein by reference and from which priority is claimed.

BACKGROUND OF THE INVENTION

1. Field of the Invention

The present invention concerns a windshield cleaning system, and more particularly, to a windshield cleaning system that heats cleaning fluid applied to the windshield.

2. Description of the Related Art

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc., and utilizes the heat from the engine coolant to elevate the temperature of the washer fluid. U.S. Pat. Nos. 5,957,384 and 6,032,324 also concern de-icing of a windshield.

SUMMARY OF THE INVENTION

Accordingly, the present invention concerns an apparatus and method for providing a large amount of heated cleaning fluid to a vehicle surface. An exemplary system has an inlet port for receiving an amount of fluid, an outlet port for dispensing an amount of heated fluid, a heating element that heats up fluid passing from the inlet to the outlet, and a control circuit for energizing the heating element with a voltage to heat the fluid passing from the inlet to the outlet.

In one exemplary embodiment, the system provides heated cleaning fluid to a vehicle surface and includes structure defining an inlet port for receiving an amount of fluid, and an outlet port in fluid communication with a reservoir for dispensing an amount of heated fluid.

These and other objects, advantages, and features of the invention will become better understood from the following detailed description of one exemplary embodiment of the present invention which is described in conjunction with the accompanying drawings.

DESCRIPTION OF THE PREFERRED EMBODIMENT(S)

The drawings depict embodiments of the present invention that concern a washer control system 10 for use with a vehicle. In the disclosed embodiments of the present invention, the control system 10 is used in conjunction with a windshield washer apparatus. The control system 10 includes a control circuit 14 that includes a power output drive circuit 20, a logic circuit 16 including an input signal interpretation portion, and a heater assembly 500 including at least one heating element 30 with at least one temperature sensor 18 and at least one thermal fuse 19 mounted together on substrate 27.

Figure 1:
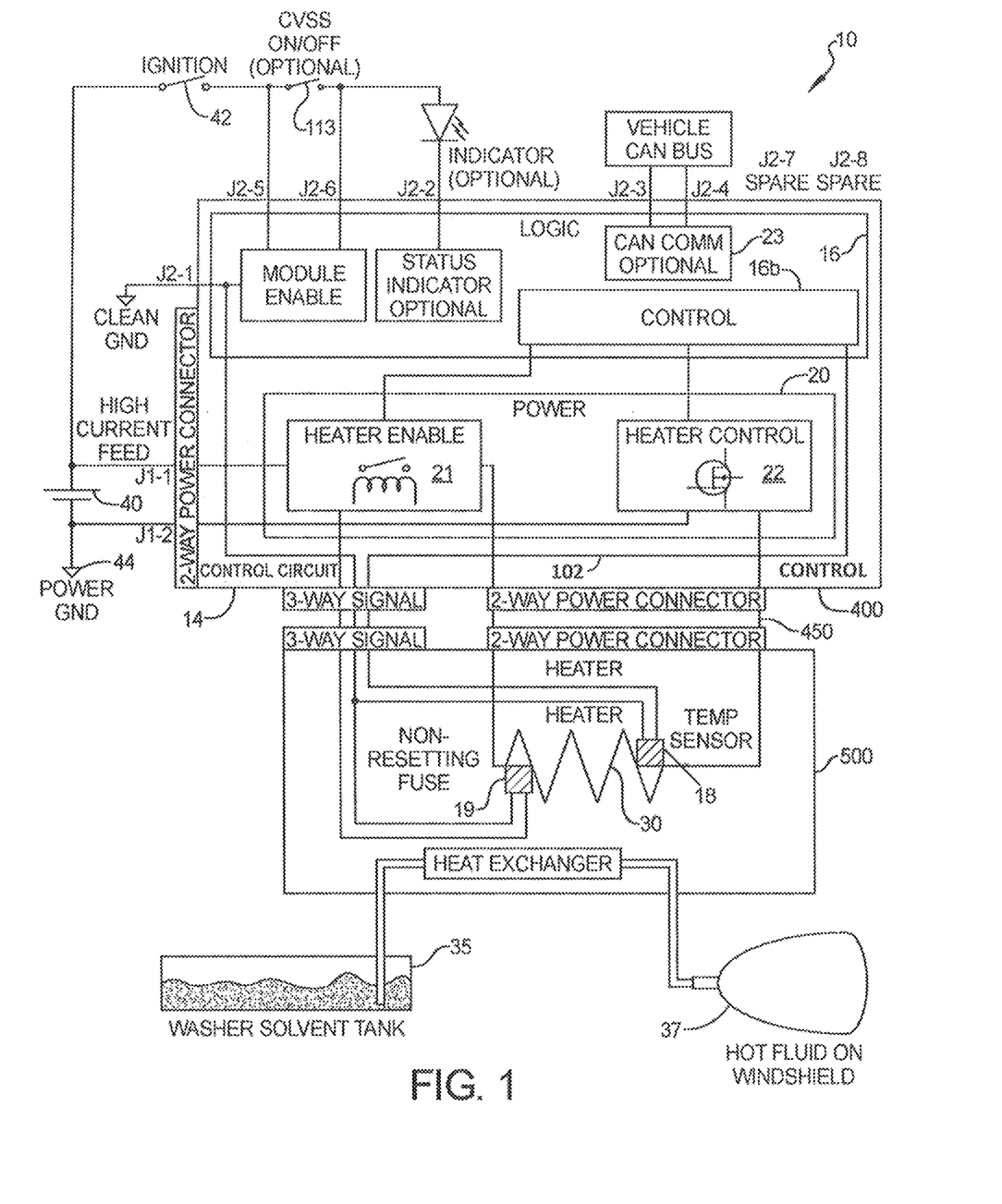
FIG. 1 is a block diagram schematic of a representative system for use with the present invention.

In FIG. 1 the logic portion 16 and the power portion 20 of the control circuit 14 are physically separated from each other by a barrier such as an interior wall section of control 400. Logic circuit 16 electronically interfaces with at least one temperature sensor 18. In one embodiment of the present invention, the temperature sensor provides signals related to the temperature of washer fluid supplied to windshield spray nozzles on the vehicle. In one embodiment of the present invention, the control system also includes a power output circuit 20 that supplies electrical power for at least one heating element that heats the windshield washer fluid contained in the heater assembly 500. One exemplary control system could have both "high side" 21 and "low side" 22 type drives working together as illustrated in FIG. 1. An alternate control system is a "low side" type drive only, meaning the module activates and deactivates the heater element by controlling the electrical circuit path to ground. Another alternate control system could have an output drive that is a "high side" type only, meaning the module activates and deactivates the heater element by controlling the electrical circuit path to a power source. In accordance with another alternate control system, an electrical interface 23 coupled to a vehicular communication bus such as CAN, LIN, FlexRay, and the like allows the control system to be controlled by vehicle communications and makes data available to the vehicle for operation, prognostics, and diagnostics of the control circuit 14.

The logic circuit 16 includes a programmable controller or microprocessor 16b that implements control algorithms for washer heater control output functions in response to vehicle input signals. As seen in the block diagram schematic of FIG. 1, the control system 10 includes power output drive circuit 20 for controlling electrical power to the heating element 30. Heating element 30 may be composed of a single heating element or multiple heating elements. By selecting heater current draw and power rating, the heating time and total system current draw can be modified over a wide range of operating parameters based on individual vehicle requirements, i.e., electrical power available. The control circuit 16 also includes input signal interpretation circuitry to monitor input signals from, as one example, a temperature sensor 18. The temperature sensor 18 provides signals that allow for control of the amount of power delivered to the heating element 30 so that a desired temperature of the heater assembly 500 can be attained and maintained. The controller monitors inputs from a vehicle battery 40 and vehicle ignition 42. It is understood that a separate ignition input 42 may not be required if all power is obtained from the battery input 40.

Figure 2:
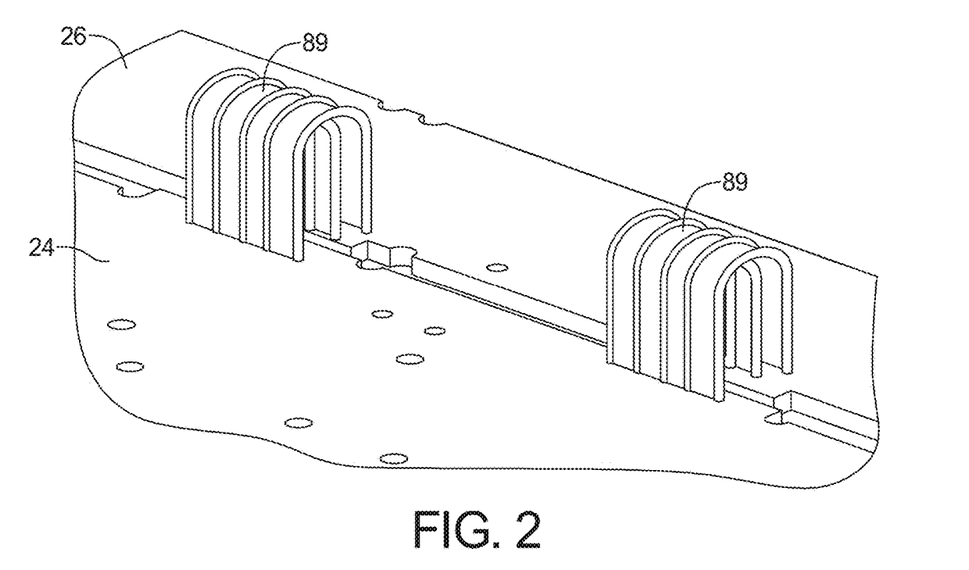
FIG. 2 is a perspective view of a circuit board with a slot of constructed according to the present invention.
Figure 3:
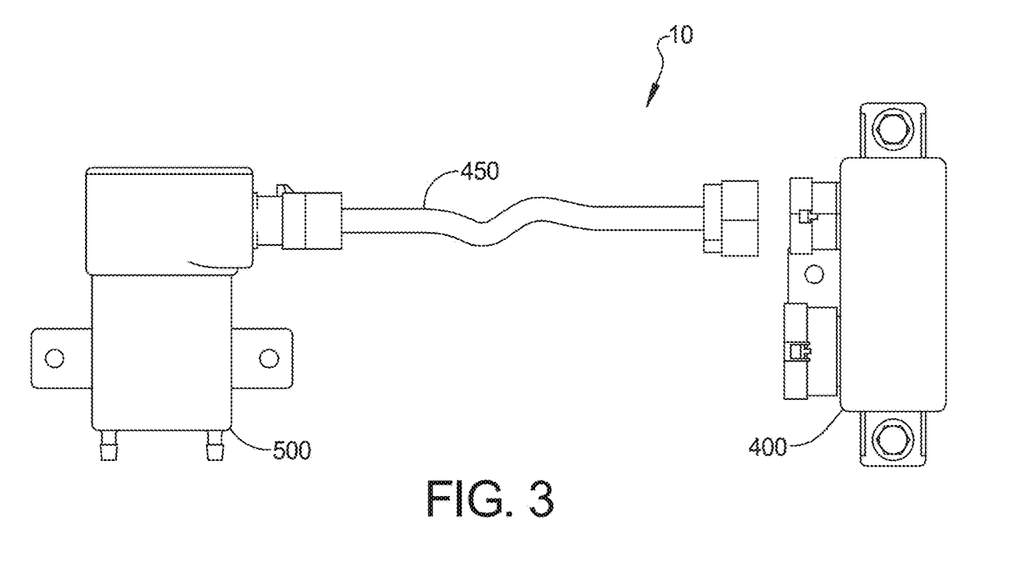
FIG. 3 is a connection diagram of the representative system for use with the system of FIG. 2.
Figure 4:
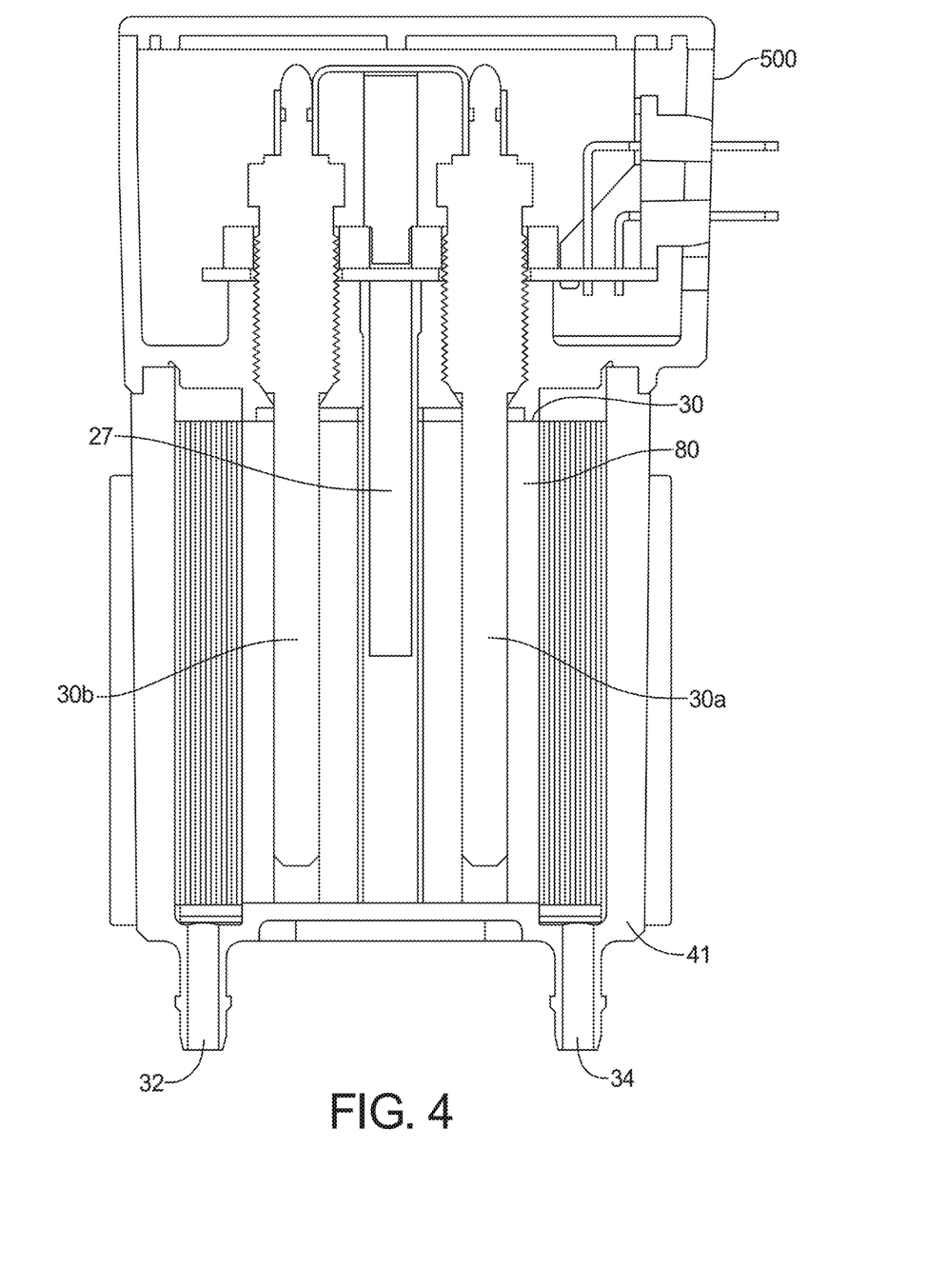
FIG. 4 is an elevation view of a representative washer control system constructed according to the present invention.
Figure 14:
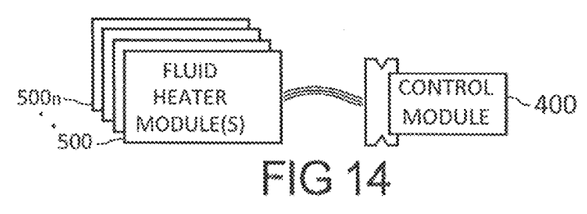
FIG. 14 is a diagrammatic view of a wiring harness connected to a control module and fluid heater modules.

In accordance with an exemplary embodiment as illustrated in the block diagram schematic of FIG. 1 with continual reference to component connection drawing FIG. 3 and heater section view FIG. 4, control system 10 may be separated such that the logic portion 16 of the control system and the power output drive circuit 20 can be physically separated into two circuit boards inside of the control 400. There has been evidence that under certain conditions there can be dendritic growth from one component connection on a circuit board to another component connection. If this occurs there can be serious failure modes associated with inadvertent connections in circuitry. Physical separation of the logic portion 16 from the power circuit 20 can be implemented to eliminate this possibility. An alternate method of separating a logic circuit from a power circuit is to place a slot in the circuit board that contains both logic section 24 and power circuitry 26 of FIG. 2. The slot will stop the migration of dendritic growth from going from one area of a circuit board to another while still allowing components 89 to connect them together. Referring back to FIG. 3 the heater portion 500 is a separate module that receives electrical signals from the control 400 through a wiring harness 450 for the energization of heater 30, temperature sensing using sensor 18, and energization control using thermal fuse 19. As illustrated in FIG. 14, a wiring harness is connected to the control 400 and a plurality of fluid heater modules 500.

In an alternate embodiment the power circuit 20 could be contained in the heater portion 500 leaving the logic circuit 16 in control 400. This allows for higher electrical current signals to be isolated to the heater portion 500, with lower electrical current signals connected to the logic circuit 16 for both vehicle connections and heater circuit control signals.

Figure 5:
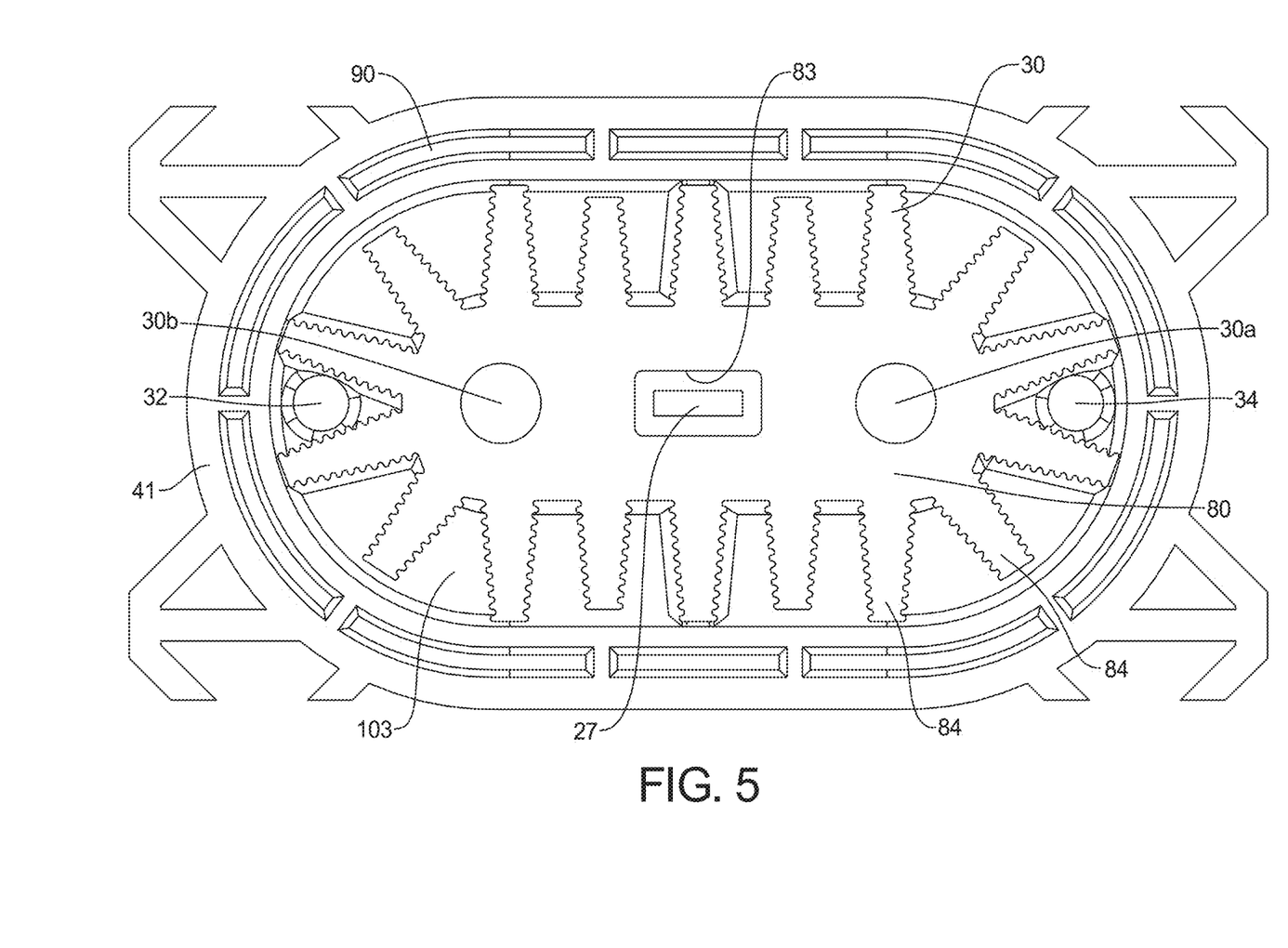
FIG. 5 is a plan view of a representative washer control system constructed according to the present invention.

In one exemplary embodiment illustrated in FIG. 1 with continual reference to FIGS. 3 and 4 the power output drive circuit 20 contained in control 400 controls power coupled to a heater element 30 in heater 500 that includes two glow plugs 30a, 30b (FIGS. 4-5). It should be realized that other heating element equivalents such as nichrome wire, ceramic heaters, or any metallic or non-metallic type heater mounted in thermal contact with a heat exchanger 80 may be used.

Heat exchanger 80 has been designed with a mass that is desirable for quickly heating fluid, having a desirable thermal mass to provide some latent heat and reduce the opportunity for boiling of fluid. Heat carrying fins 84 of heat exchanger 80 have ridges to gain surface area for improved heat transfer of thermal energy from the heat exchanger to the fluid as it flows past. Fluid is routed past the heat exchanger 80 in thermal contact with heat carrying fins 84 by routing fluid into an inlet 32 and then out outlet 34. The inlet receives washer fluid from a fluid reservoir 35 (FIG. 1) of a motor vehicle and the outlet 34 delivers heated washer fluid to nozzles 37 mounted to the vehicle which direct the washer fluid against a vehicle surface, typically a windshield, lift gate glass, headlamps, camera lens, etc. FIG. 5 depicts a section view of an exemplary embodiment of a housing 41 of heater 500 that defines a fluid reservoir 103 that surrounds the heat sinks. The housing 41 is constructed from plastic or other material with favorable thermal and structural characteristics and has air chamber features 90 that act as an insulating chamber from the environment outside the housing 41 and the heated fluid in reservoir 103. Air chamber features 90 also act as a compressible space when the wall between air chamber features 90 and fluid reservoir 103 moves due to the freezing of fluid in reservoir 103 thereby removing the risk of wall fracture due to said freezing fluid.

The control 400 (FIGS. 1 and 3) constructed in accordance with the exemplary embodiment of the present invention implements control algorithms for washer heater control output functions in response to vehicle input signals. As washer fluid temperature changes due to ambient temperature changes, battery voltage changes, and the like, the duration of applied heat is increased or decreased in order to maintain a washer fluid at or near a target temperature. Control of the heating may also include redundant failsafe mechanisms such as a thermal fuse 19 (FIG. 1).

The block diagram shown in FIG. 1 depicts operation of a control system 10 having external electrical connections, which include battery 40, ground 44, and ignition 42. The block diagram also shows further external electrical connections including a user operated system enable switch 113 and CAN communications 23. The battery input connection 40 provides the voltage supply needed by the control system 10. This connection allows the high current flow required by the heating element. The ground connection 44 provides the current return path to the battery negative terminal. This ground connection allows the high current flow required by the heating element plus the requirement of the control system 10. An ignition input 42 provides power to the controller. It is understood that separate ignition input 42 may not be required if all power is obtained from the battery input 40 and conversely a battery input may not be needed if all power is obtained from the ignition input 42. The battery voltage is monitored by the control circuit 14 to determine if there is sufficient voltage present to allow the control system to operate.

The control 16b input 102 is from the temperature sensor 18 (FIG. 1) and is in physical contact with the heat exchanger 80 (FIGS. 4-5) providing a signal that is directly related to washer fluid temperature. Washer fluid temperature is monitored by using a temperature sensor such as a thermistor, RTD, or the like. The washer fluid is monitored non-invasively by attaching the temperature sensor to the heater. Alternatively, the fluid temperature could be monitored invasively by placing a temperature sensor directly into the fluid through a threaded fitting or other suitable attachment method. It is understood that the control circuit 14 and control 400 of FIG. 2 can optionally have an output to control the washer pump of system 10 or the vehicle wiper motor either directly or by communications through a communications protocol such as CAN, LIN, etc.

In an embodiment of the present invention, a desired heater temperature is predetermined to be in a range between 120 and 135 degrees Fahrenheit. Placing the temperature sensor 18 in physical contact with the heat exchanger 80 and maintaining the heater temperature at a temperature at or below 135 degrees Fahrenheit prevents the heating element from heating the cleaning fluid to an undesirable temperature, such as at the temperature at which the fluid boils. Ensuring that the washer fluid does not boil will prevent the undesirable effect of washer fluid weeping from the nozzles. It also helps prevent the formation of mineral deposits that could potentially clog the fluid dispensing nozzles. If the temperature sensor 18 is not mounted directly on the heating element, but is rather located in the fluid reservoir 103, only an approximate, latent measurement of the heating element temperature is sensed. This would allow the heat exchanger 80 to heat to a temperature that is hotter than the desired fluid temperature in the fluid reservoir 103 and potentially cause boiling and the formation of nozzle clogging mineral deposits. It is well known that the boiling temperature of fluid is influenced by air pressure variations due to altitude. Water boils at 212° F. at sea level and at 189° F. at 12,000 ft. which is a high altitude requirement of some vehicle manufacturers. The same effect is seen in alcohols that are typically used in washer fluids only the boiling temperatures are much lower. Methyl alcohol boils at 148° F. for example. An aspect of the exemplary embodiment is to use the elevation of the vehicle so that the temperature of the fluid can be controlled such that the fluid will never be allowed to boil and yet allow the temperature of the fluid to increase thereby further improving the efficacy of the fluid for cleaning. Two methods that can be used to determine elevation is by an air pressure sensor or global position satellites (GPS). Components required to determine elevation by these means could be incorporated into washer control system 10 or alternately elevation could be gathered from vehicle based sensors, or other devices like cell phones and GPS devices that are coupled to the vehicle or washer system 10 either by direct connection or by blue tooth communications or other communications means.

A further aspect of the exemplary embodiment would be to use GPS or cell phone towers to determine geographic location worldwide. Different countries have regulations for what type of cleaners and solvents can be used in an automotive washer system. If it is known that a vehicle is in a certain geographic area that uses only isopropyl alcohol based washer fluid which has a boiling point of 177° F., the desired fluid temperature threshold can be modified to say accommodate the boiling point of the various fluids allowed in that area. This will allow higher fluid temperatures to be used thereby gaining an improvement in fluid cleaning efficacy and yet ensuring that the fluid does not boil. Having elevation and geographic awareness enhances cleaning ability and guards against boiling of washer fluid.

Upon initiation of the heating function, the output drive is turned on for a maximum on time or until the feedback temperature reading approaches a set point temperature. In one embodiment, a preset maximum on time is derived to stay below the boiling point of the cleaning fluid. Subsequently the control will read the heating element 30 temperature via temperature sensor 18 and determine if power should be reapplied. If the sensed temperature is below the desired set point, the output will be re-enabled at a variable duty cycle so that the heater 30 is heated to the set point goal temperature as quickly as possible without exceeding a maximum allowable overshoot temperature.

Normal operation consists of maintaining the fluid temperature at the desired set point temperature by varying the duty cycle at which voltage is applied across the glow plugs 30a and 30b of heater 30. The output duty cycle changes based on how far the sensed temperature is below the set point temperature.

In the event the operating voltage from the battery or ignition exceeds a predetermined high limit or is below a predetermined low limit the control 16 provides a load shedding function by disabling the output 20 for a timeout period. After the timeout period, if voltage conditions are within normal parameters, the control again enables the output. It is understood that the operating voltage range can be set to whatever voltages are required for a particular application.

In FIG. 1 heater 30 is energized with battery voltage by a relay 21. A thermal fuse 19 is in series with the relay coil and is in proximity to the heater 30. If the heater becomes too hot, the thermal fuse 19 will open and cease providing voltage to the relay coil thereby removing voltage from the heater.

It should be realized that heated fluid is beneficial to cleaning other surfaces besides windshields. In another embodiment, heated fluid is beneficial when used to clean both front and rear camera systems located on a vehicle. It is a well-known problem in the automotive industry that rear facing cameras get coated with road grime such as mud, dust, oil, salt, etc., while driving due to the low pressure area created behind the vehicle. In the low pressure area, dust and other contaminants are deposited onto vehicle surfaces including but not limited to lights/lamps, plastic, metal, carbon fiber, and glass objects, radar and LIDAR emission surfaces, etc. Specifically included in the surface list are camera lenses. A camera lens, when coated with residue, renders the rear facing camera's transmitted image less than desirable, to the point of non-usable. An ambient temperature spray from a spray nozzle would benefit the surface in removing residue, but a heated fluid spray further improves cleanliness, speeds the cleaning process, and helps reduce in fluid usage.

There is also an issue with forward facing surfaces including, but not limited to, lights/lamps, plastic, metal, and glass objects in that they, too, collect road grime. Forward looking cameras and lamps collect road grime such as mud, dust, oils, salt, and insects due to direct impact. As with the rear facing surfaces, an ambient temperature spray would benefit the surfaces in removing residue, but heated fluid sprayed from a spray nozzle will further improve cleanliness, speeds the cleaning process, and helps reduce in fluid usage.

A method used to keep a camera lens clean involves the clarity of what a camera sees and heated wash system 10. If an electronic module that uses the camera image, analyzes the image and determines that the lens is dirty, a wash cycle, and preferably a heated wash cycle, could initiate to clean the lens. In an exemplary embodiment this would be automatic so the driver always has a clear image from the camera and does not need to be involved in its cleaning. However, the system could be manual having the electronics module notify the driver to initiate a wash cycle. Likewise, if a camera system or other type sensor such as light intensity were to analyze a headlamp for clarity or light output, a wash cycle, or preferably a heated wash cycle, could commence and spray wash the headlamp.

Additionally, heated fluid could be used to aid in the cleaning of vehicular lighting. The automotive industry, Europe in particular, has had washer systems for headlamps for many years. While beneficial to have a wash fluid spray from a nozzle on the headlamp surface it is an improvement to spray the headlamp surface with heated fluid.

To further aid in cleaning of both forward and rearward facing surfaces, various coatings could also be applied. For example, an oleophobic and/or lipophobic surfactant could be applied to camera lenses and lamp lenses to help reduce the amount of oils and proteins (from insects) that stick to the surface. An oleophobic surfactant, in combination with a heated wash fluid spray significantly improves the cleanliness of a surface and the ability to clean the surface.

Figures 11, 12:
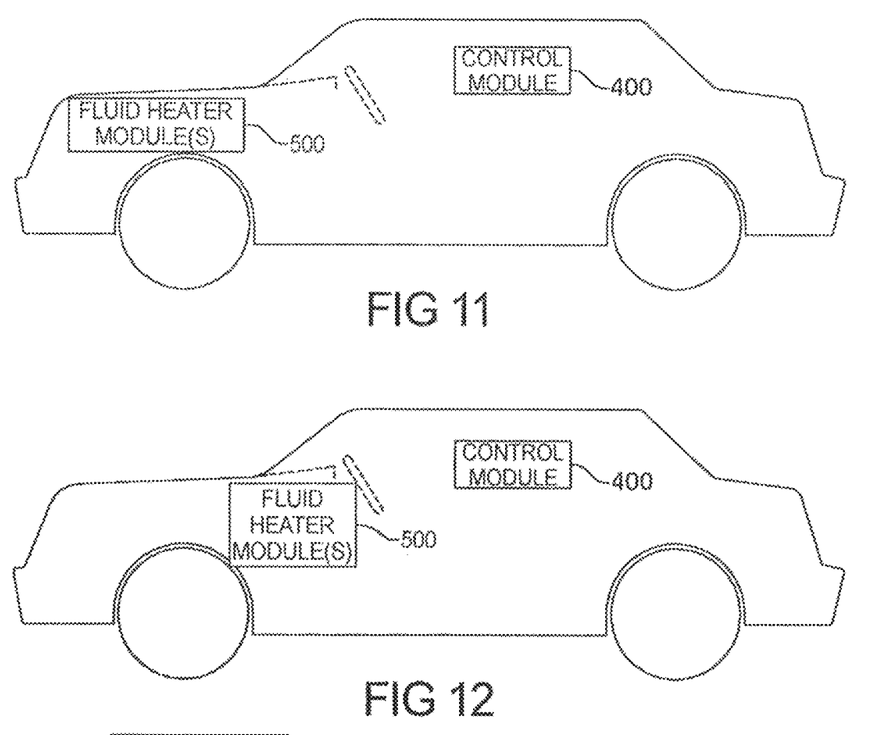
FIG. 11 is a diagrammatic view of a control module in a cabin of a vehicle and fluid heater modules under a hood of a vehicle.
FIG. 12 is a diagrammatic view of a control module in a cabin of a vehicle and fluid heater modules under a cowling of the vehicle.
Figure 13:
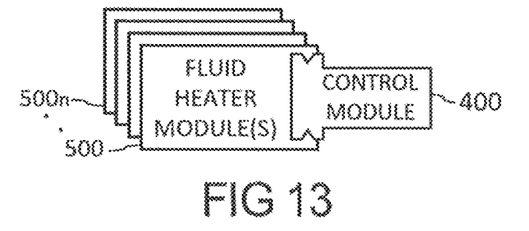
FIG. 13 is a diagrammatic view of a control module and fluid heater modules being snapped together.

A further embodiment of the invention is a washer system 10 that includes a control 400 and at least two heaters 500 that are mounted advantageously to provide heated washer fluid to multiple surfaces on a vehicle. For example each spraying nozzle for a windshield could have its own heater 500 thus providing more heated fluid per nozzle allowing longer spray times with heated fluid. To further increase the efficacy of washer system 10 the heater 500 should be mounted as close to the spray nozzle as possible. In the case of the windshield nozzles the heater 500 could be mounted in the engine compartment of a vehicle (See FIG. 11) or under the cowling at the base of the windshield (See FIG. 12) so that the distance between the heater and nozzle is further reduced. Another example is where a heater 500 is located in the front of the vehicle for use on the windshield and another heater 500 located in the rear of the vehicle providing heated washer fluid for rear windows, camera lenses, lights, etc. The aforementioned washer system 10 is advantageous in that it reduces overall washer system 10 cost since only one control 400 is needed for multiple heaters 500 instead of a control with each heater. It is understood that while the heater 500 portion of system 10 is advantageously mounted close to its respective nozzle(s) the control 400 can be mounted in the engine compartment and harness 450 connects it to heater 500 modules. It is also understood that the control can be mounted in the passenger compartment of a vehicle providing a less stressful operating environment and then connected to heater 500 module(s) by running harness 450 through the vehicle firewall for example to the engine compartment or cowling area for connection to heater(s) 500. Referencing FIG. 3 an alternate embodiment configuration removes the necessity of harness 450 and allows control 400 and heater 500 to connect directly to each other via housing mounted connectors (See FIG. 13). It should be appreciated that the operation of the fluid flow through the heat exchanger is similar to the fluid flow through the heat exchanger 80 disclosed in FIG. 18 of U.S. Patent Application Publication No. 2016/0046264, the entire disclosure of which is hereby expressly incorporated by reference.

Figure 8:
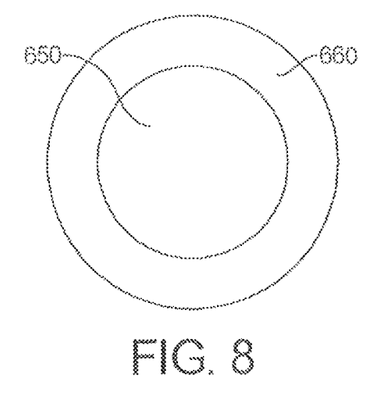
FIG. 8 shows an electrically conductive element in proximity to a fluid nozzle.

Referring to FIG. 8, in another embodiment of the present invention, an electrically conductive element 660 is in proximity to a target such as a camera lens 650, the lens of a LIDAR sensor, or simply a surface area that is desired to keep clean. The conductive element 660 is charged appropriately such that dust particles in the immediate vicinity will pick up a charge of the same polarity resulting in the repulsion of the dust particles, thereby reducing dust build up on the lens 650 or the surface area. In a like manner, the conductive element 660 could be charged such that dust particles are attracted to the charged area keeping them from landing on the lens or the surface area.

Figure 9:
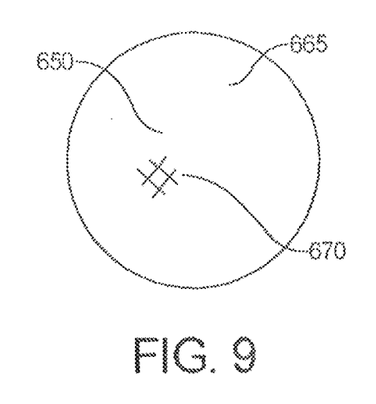
FIG. 9 is a lens with an electrically conductive coating on its surface.

Referring to FIG. 9, in yet another embodiment of the present invention, the lens surface 665 of the lens 650 may have an electrically conductive coating 670 thereon that would allow for a charge to be placed directly on the lens 650 to repel dust. The electrically conductive coating 670 could also be energized such that heat is generated in the coating, thereby enabling the melting of ice and snow from the lens surface 665.

Figure 15:
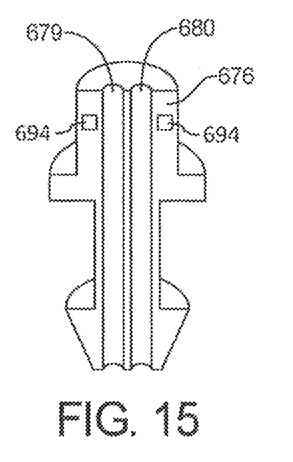
FIG. 15 is a sectional view of a piezo element to cause pulsation of the fluid in a nozzle.

Referring again to FIG. 1, another embodiment of the present invention provides for heated fluid that is dispensed from a spray nozzle or orifice 37 that provides fluid at a defined pressure and/or volume to a lens or desired surface such that the fluid stream is pulsated to aid in the cleaning of debris from the lens. The fluid stream may also be articulated in a back and forth sweeping motion to aid in the removal of debris. The fluid stream could be both pulsated and have a sweeping motion during the dispensing of fluid. The pulsation of the stream could be achieved by having the fluid stream modulated as it passes through or by a piezo element 694 in the nozzle or orifice 37 (See FIG. 15).

Figure 7A:
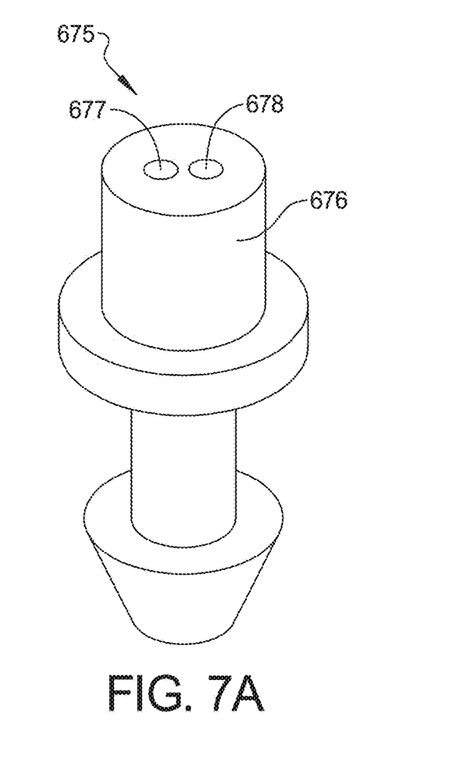
FIGS. 7A and 7B are perspective and section views of a dual ported nozzle.
Figure 7B:
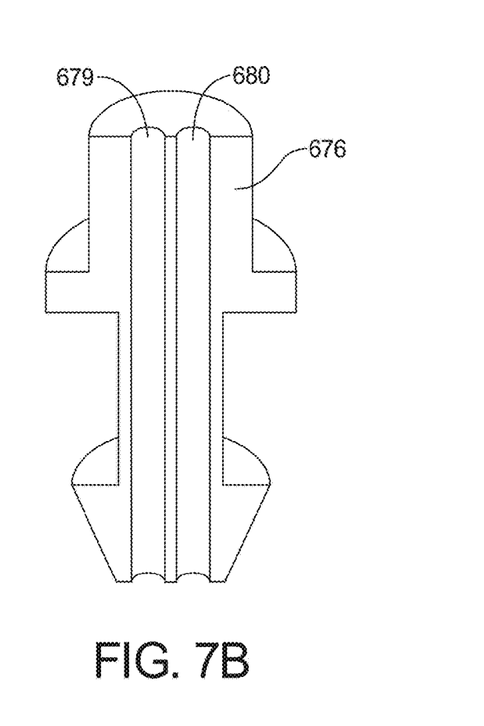

Referring to FIGS. 7A and 7B, another embodiment of the present invention provides for a stream of air to be directed toward a camera or LIDAR lens or other surface area. In the event of dust, dirt, or other contaminant build up on a surface, it is desirable to remove the contaminant such that a minimal amount of washer fluid is consumed. In certain cases where the contaminant is not strongly adhered to the surface, a stream of air projected at a velocity such that the contaminants are removed by simply blowing them off similar to the common canned air that is widely used to clean computer keyboards from dust. In one embodiment, a nozzle 675 is shown for directing air and/or fluid. The nozzle 675 includes a body 676 that contains two orifices 677 and 678 with orifice channels 679 and 680 that go full through the body 676 as shown in FIG. 7B, such that one orifice 677 is for air and one orifice 678 is for fluid.

A preferred cleaning method of a lens or surface area would be to begin with an air stream of a given velocity and pressure to remove dust, water drops, and other non-adhered contaminants. If it is deemed necessary to further clean the surface area, fluid could be directed as described previously to clean the surfaces.

Another method, according to the present invention, combines the air and fluid streams together into a common stream such that both fluid and air are discharged simultaneously to clean the surface. The fluid is propelled at a higher velocity due to the pressurized air traveling with the fluid.

Figure 6:
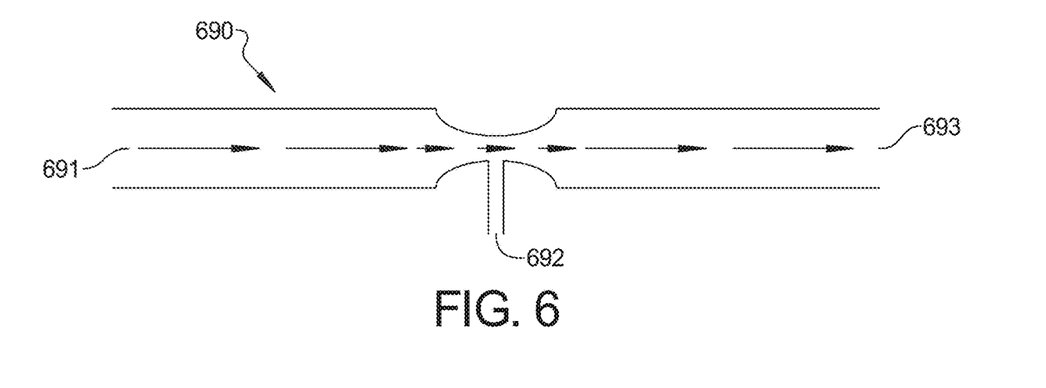
FIG. 6 is a venturi based distribution system.

Referring to FIG. 6, to obtain air to direct toward a surface to be cleaned, a pressurized vessel could be maintained to provide air to be discharged at a given velocity. Air could also be provided by an air pump on an as-needed basis. One approach is to have the fluid path from the reservoir and pump to include a venturi 690 such that as the motive fluid 691 is flowing, air is drawn in through a port 692 and pressurized. Upon exiting an outlet 693 of the venturi 690, the air/fluid mix is delivered to a nozzle. The entrained compressed air expands, further accelerating the fluid to a higher velocity to impinge upon the desired surface area.

Another approach is to use a venturi 690 to draw fluid from a reservoir that is then directed toward a surface. Air could be driven through an inlet port of the venturi 690 and a low pressure port 692 would draw fluid into the air stream driving the fluid particulates toward a surface to be cleaned. In this embodiment, the air could be heated prior to its entering the venturi 690 so that when fluid is drawn into the venturi 690, the fluid picks up heat from the air so that when the fluid is dispensed, the fluid has an increased temperature allowing for better cleaning of the desired surface.

Another embodiment of the present invention uses a sensor that is integral to the fluid heating system to determine the type of fluid that is being used, e.g., methanol, isopropyl, or plain water. By sensing the dielectric constant of the fluid, the fluid type can be determined. When the constituency of the fluid is known, the temperature to which the fluid can be heated can be adjusted to allow for hotter fluid without exceeding the boiling temperature of a particular type of fluid. The cleaning capability of the fluid is enhanced with increased temperature while still not allowing the fluid to boil off.

In an autonomous vehicle, it is imperative that camera lenses remain clean so that valid data is always available for situational awareness as it relates to moving and non-moving objects, i.e., proximity to cars, pedestrians, etc. A method of determining if a camera lens needs to be cleaned entails taking an image from a camera, specifically from a particular or predetermined first area. To the image, analyses are performed by the controller to determine key characteristics of objects in the image such as edges, shapes, color, contrast, etc. As the objects in the field of view come closer to the vehicle, they will become larger and encompass more and more pixels, or a higher percentage, of the total pixels available in the entire image. As key characteristic analyses are performed on an ongoing basis, it can be anticipated where any particular object, or feature of an object, will be located in the overall image based on speed and direction of the vehicle. If, in the projected path of an anticipated feature, the feature is removed, or is removed and returned, to a predetermined second area of the projected path, the controller can determine that the image is being blocked by dirt, an insect, or other contaminant on the lens of the camera. On an ongoing basis, if features of multiple objects are always blocked in a particular area, it increases the confidence that there is indeed blockage on that area of the lens. Once the controller determines that a lens is dirty, cleaning of the lens may commence.

Figure 10:
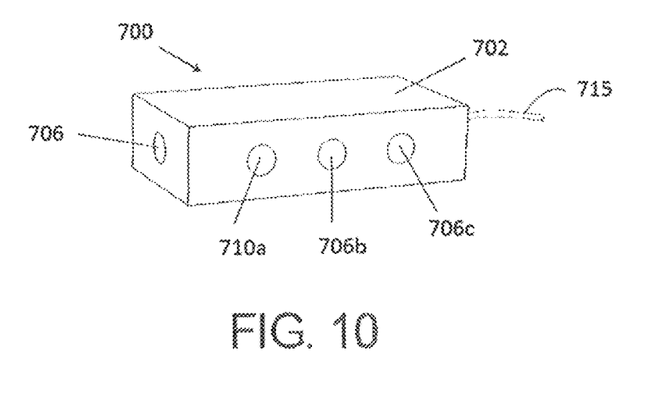
FIG. 10 is a manifold based distribution system.

In certain cases, there may be multiple lenses and/or surface areas that need to be cleaned. Referring to FIG. 10, one embodiment of the present invention provides for selectively dispensing fluid through individual orifices or multiple orifices either sequentially or at the same time. In this embodiment, a manifold system 700 is included with a manifold body 702 for selectively choosing a flow path associated with a particular orifice (spray nozzle). Fluid is pumped from a reservoir through an inlet 706 of the manifold 702 to at least one output orifice 710a, 710b, 710c. If a lens, such as from a camera or LIDAR sensor is determined by the controller to be in need of cleaning, the fluid path associated with that particular lens will be chosen and fluid dispensing will commence.

The flow path selection is determined by the controller or by the vehicle operator and a signal is then sent by the controller through an electrical harness 715 to the manifold 702 to energize a solenoid, a valve, or the like, that in turn, allows fluid to flow through a chosen path 710a, 710b, or 710c.

In a preferred embodiment, the manifold system 700 will allow for fluid paths, singly or in groups, to be chosen according to need, as well as allow for fluid and air to be dispensed together or each individually. It should be appreciated that the manifold system 700 has a single nozzle with at least one orifice that accommodates both fluid and air dispensing.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An apparatus for providing a heated cleaning fluid to a vehicle surface comprising:
   a housing extending in a first direction defining two interior chambers spaced from each other in the first direction by a separating wall extending in a second direction perpendicular to the first direction to completely isolate said interior chambers from each other, said housing including an inlet port for routing fluid into a first chamber of said interior chambers for receiving and heating fluid from an external source;
   said housing further defining an outlet port in fluid communication with said first chamber for dispensing an amount of heated fluid to a nozzle for spraying heated fluid onto a surface wherein said separating wall separating said interior chambers prevents fluid from leaking out of said first chamber into a second chamber of said interior chambers;
   a heating element for heating fluid that passes from said inlet port to said outlet port through said first chamber;
   a heat exchanger supported by said housing in a position that is at least partially covered by fluid within said first chamber and coupled to said heating element so that heat emitting surfaces of said heating element engage and transmit heat to said heat exchanger; and
   a control circuit disposed in said second chamber and including separate logic and power printed circuit boards connected to said heating element for energizing said heating element with a voltage and thereby heat fluid passing from said inlet port to said outlet port through said first chamber.

2. The apparatus of claim 1 wherein the heat exchanger has a serpentine fluid path.

3. The apparatus of claim 1 including a plurality of fluid heater modules physically separated from each other.

4. The apparatus of claim 1 including a fluid heater module incorporating said heating element having fluid heater functionality.

5. The apparatus of claim 1 including one of a GPS, altitude sensor, and geography sensor communicating with said control circuit to determine elevation of said housing.

6. The apparatus of claim 3 wherein said fluid heater modules are disposed under a hood of the vehicle.

7. The apparatus of claim 3 wherein said fluid heater modules are disposed under a cowling of the vehicle.

8. The apparatus of claim 1 including a control module incorporating said control circuit and at least one fluid heater module incorporating said heating element, said control module and said at least one fluid heater module being physically connected together.

9. The apparatus of claim 1 including a control module incorporating said control circuit and at least one fluid heater module incorporating said heating element, and a wiring harness connected to said control module and said at least one fluid heater module.

10. The apparatus of claim 1 including a plurality of fluid heating modules and a plurality of the nozzle, one of said plurality of said fluid heating modules for each of said plurality of the nozzle.

11. The apparatus of claim 1 wherein the control circuit provides an auto fluid dispensing function to automatically dispense fluid from said housing.

12. The apparatus of claim 1 including a user operated enabled switch connected to one of a CAN communications bus and a LIN communications bus to allow a user to switch between the one of the CAN communications bus and the LIN communications bus.

13. The apparatus of claim 1 wherein the control circuit has a circuit board configuration including logic and power printed circuit boards with a slot between the logic and power printed circuit boards.

14. The apparatus of claim 1 including an electrically conductive object adapted to be disposed adjacent the vehicle surface to either one of attract or repel dust particles relative to the vehicle surface.

15. The apparatus of claim 1 wherein said nozzle has one end for spraying heated fluid onto the vehicle surface at one of a defined pressure and a defined volume.

16. The apparatus of claim 1 wherein said nozzle has one end for spraying a stream of air toward the vehicle surface.

17. The apparatus of claim 1 including a venturi prior to said nozzle to pressurize the fluid.

18. The apparatus of claim 1 including a manifold system fluidly connected to said nozzle for selectively choosing a flow path associated with said nozzle.

19. A method of providing a heated cleaning fluid to a vehicle surface, said method comprising the steps of:
   providing a housing extending in a first direction defining two interior chambers spaced from each other in the first direction by a separating wall extending in a second direction perpendicular to the first direction to completely isolate the interior chambers from each other;
   providing an inlet fluid path for routing fluid into a first chamber of the interior chambers for heating fluid from an external source;
   providing an outlet fluid path in fluid communication with the first chamber for dispensing an amount of heated fluid to a nozzle for spraying heated fluid onto a surface;
   separating the first chamber from a second chamber of the interior chambers with the separating wall that separates the first chamber and the second chamber to completely isolate the interior chambers from each other that prevents fluid from leaking from the first chamber into the second chamber;
   mounting a heater and a heat exchanger in heat transfer relation to each other for heating fluid that passes through the first chamber;
   connecting a control circuit disposed in the second chamber and including separate logic and power printed circuit boards for energizing the heater with a voltage and thereby heat fluid passing through the first chamber; and
   causing fluid to flow through the first chamber while energizing the heater to heat the fluid within the first chamber.

20. The method of claim 19 wherein the separating wall comprises a removable cover which is removed during placement of the heat exchanger within the first chamber.

21. The method of claim 19 additionally comprising the step of sealing a region of the separating wall in the first chamber to inhibit seepage of fluid from the first chamber.

22. The method of claim 19 additionally comprising the step of coupling the control circuit to a motor vehicle communications bus for communicating data to other vehicle components coupled to the motor vehicle communications bus.

23. The method of claim 19 wherein the vehicle surface is a lens comprising one of a camera lens, LIDAR lens, and a lamp lens.

24. The method of claim 19 wherein the nozzle sprays fluid onto the vehicle surface at one of a defined pressure and a defined volume.

25. The method of claim 19 including reading a dielectric constant to aid in determining alcohol and water mixture concentration to determine a type of the fluid being used.

26. The method of claim 19 including transferring thermal energy from heated air to the fluid.

27. The method of claim 19 including using a piezo element to cause pulsation of the fluid in fluid fittings or the nozzle.

28. The method of claim 19 including cleaning of a lens or surface area with an air stream of a given velocity and pressure to remove dust, water drops, and other non-adhered contaminants.

29. The method of claim 28 including combining the air stream and a fluid stream together into a common stream such that both fluid and air are discharged simultaneously to clean the surface.

30. The apparatus of claim 1 including an electrically conductive coating on a lens surface of a lens to allow for a charge to be placed directly on the lens to repel dust.

31. The apparatus of claim 30 wherein the electrically conductive coating is energized such that heat is generated in the coating, thereby enabling the melting of ice and snow from the lens surface.

* * * * *